United States Patent [19]

Attix

[11] Patent Number: 5,361,283

[45] Date of Patent: Nov. 1, 1994

[54] GUIDE TUBE RETAINER

[75] Inventor: Douglas J. Attix, Lynchburg, Va.

[73] Assignee: B&W Fuel Company, Lynchburg, Va.

[21] Appl. No.: 214,713

[22] Filed: Mar. 15, 1994

[51] Int. Cl.$^5$ ............................................. G21C 3/30
[52] U.S. Cl. .................................. 376/446; 285/307; 285/319; 285/921
[58] Field of Search ............... 376/446, 327, 463, 353; 285/319, 921, 205, 162, 194, 307, 314; 403/329, 330, 380, 377

[56] References Cited

U.S. PATENT DOCUMENTS

| | | | |
|---|---|---|---|
| 2,823,932 | 2/1958 | Schigut | 285/921 |
| 3,183,297 | 5/1965 | Curtiss | 285/162 |
| 3,769,158 | 10/1973 | Winders | 376/446 |
| 4,366,116 | 12/1982 | Christiansen et al. | 376/446 |
| 4,610,468 | 9/1986 | Wood | 285/319 |
| 5,024,808 | 6/1991 | Land et al. | 376/353 |
| 5,131,687 | 7/1992 | Marchou | 285/314 |
| 5,147,599 | 9/1992 | Mansson | 376/446 |
| 5,232,655 | 8/1993 | Verdier | 376/353 |
| 5,265,141 | 11/1993 | Kobsa | 376/446 |
| 5,268,948 | 12/1993 | Church et al. | 376/446 |

Primary Examiner—Behrend E. Harvey
Attorney, Agent, or Firm—R. J. Edwards; D. Neil LaHaye

[57] ABSTRACT

An integral, reusable locking arrangement between the guide tube assembly and upper end fitting of a reconstitutable fuel assembly that eliminates all loose fastener components at the reactor site. A retainer sleeve is fabricated to cooperate with the upper end sleeve of the guide tube assembly. Slots adjacent to the upper end of the sleeve receive rigid tabs on the upper end sleeve to hold the retainer sleeve and upper end sleeve together. The retainer sleeve is formed from a cylindrical tube that has a plurality of flexible curved tabs spaced around the circumference of the tube substantially at the mid section of the tube. Optional lower tabs serve to center the guide tube assembly in the upper end fitting and provide a more rigid connection. The mid section tabs are received against the shoulders of slots provided along the walls of the hole in the upper end fitting and serve to retain the guide tube assembly and upper end fitting in the installed position. Removal of the upper end fitting is accomplished by rotation of the retainer sleeve to force the tabs inboard and then sliding the upper end fitting upward.

3 Claims, 2 Drawing Sheets

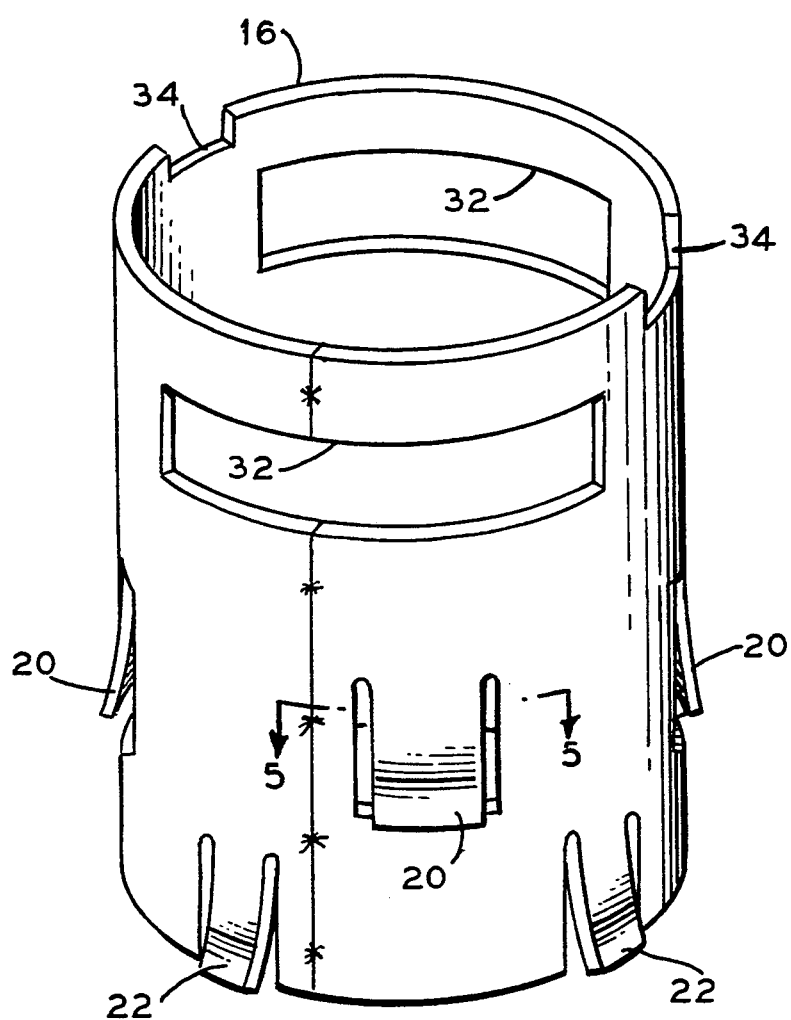

GUIDE TUBE RETAINER

BACKGROUND OF THE INVENTION

1. Field of the Invention

The invention is generally related to nuclear fuel assemblies and more particularly to a reusable locking arrangement for guide tubes and upper end fittings.

2. General Background

In a nuclear reactor core, each fuel assembly is fitted with a number of guide tubes that are used to receive control rods. In the nuclear industry, the tubes that are used to receive control rods are referred to as guide tubes or thimble tubes and the upper internal structure that these tubes are attached to are referred to as an upper end fitting or a top nozzle, depending on the manufacturer. Therefore, it should be understood that references herein to a guide tube and upper end fitting should be considered as also referring to a thimble tube and top nozzle. The guide tubes have a relative thin wall thickness and thus require a sleeve at the upper end to provide the necessary support for attachment points and shoulder stops. During assembly, the guide tubes are inserted into the spacer grids. The upper end fitting is then aligned with, received on, and attached to the upper end sleeves of the guide tubes. Typically, upper end fittings and sleeves are attached to one another by the use of threaded joints and locking cups. When it becomes necessary to remove an irradiated fuel assembly upper end fitting or nozzle at the reactor site, the work must be done with remotely controlled tooling under water. This results in the handling of a number of parts and provides the potential for cross threading the fasteners during installation. The remote handling of a number of parts under water increases the potential for loose parts in the system that can damage the reactor and increases working time. Patents directed to nuclear fuel assembly end fitting retainers that applicant is aware of include the following.

U.S. Pat. No. 3,769,158 discloses the use of an end fitting over fuel rods where a reduced neck extending through the opening in the end fitting has resilient split rings in grooves and engage the end fitting.

U.S. Pat. No. 3,828,868 discloses guide tubes that are threadably attached to the end fitting.

U.S. Pat. No. 4,699,761 discloses the use of a threaded sleeve on the upper end of the guide tube.

SUMMARY OF THE INVENTION

The invention addresses the above need. What is provided is an integral, reusable inexpensive locking arrangement between the guide tube assembly and upper end fitting that eliminates all loose fastener components at the reactor site. A retainer sleeve is fabricated to cooperate with the upper end sleeve of the guide tube assembly. Slots adjacent to the upper end of the sleeve receive rigid tabs on the upper end sleeve to hold the retainer sleeve and upper end sleeve together. The retainer sleeve is formed from a cylindrical tube that has a plurality of flexible tabs spaced around the circumference of the tube substantially at the mid section of the tube. Optional lower tabs serve to center the guide tube assembly in the upper end fitting and provide a more rigid connection. The mid section tabs are received against the shoulders of slots provided along the walls of the hole in the upper end fitting and serve to retain the guide tube assembly and upper end fitting in the installed position. The retainer sleeve is rotated to force the tabs inward to allow for removal of the upper end fitting from the guide tube assembly.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

FIG. 4 is a perspective view of the retainer sleeve according to the invention.

DETAILED DESCRIPTION OF THE PREFERRED EMBODIMENT

Figure 1:
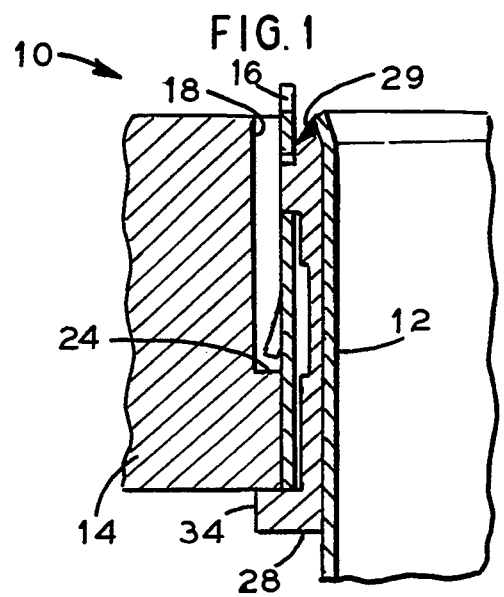
FIG. 1 is a sectional view of a guide tube assembly installed in an upper end fitting using the invention.

Referring to the drawings, it is seen in FIG. 1 that the invention is generally indicated by the numeral 10. Locking arrangement 10 is integral to the guide tube assembly 12 and is designed to be reusable without the release of loose parts in the system. Locking arrangement 10 is generally comprised of a retainer sleeve 16 that cooperates with slots 18 in upper end fitting 14 to lock the guide tube assembly and upper end fitting together in their installed position.

Figure 2:
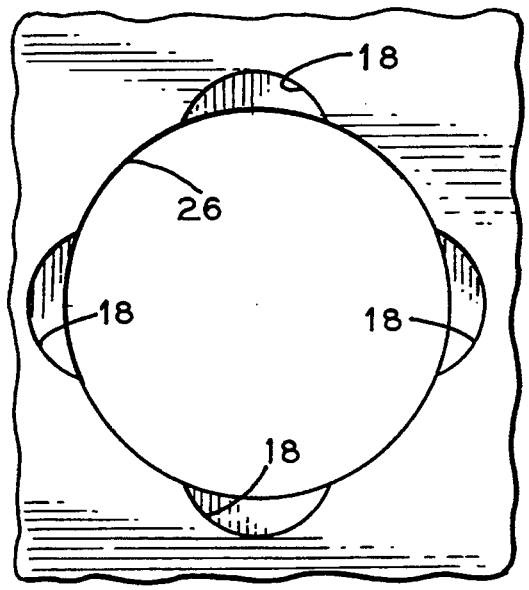
FIG. 2 is a top view of a portion of an upper end fitting used according to the invention.
Figure 5:
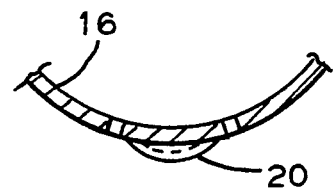
FIG. 5 is a view taken along lines 5—5 in FIG. 4.

As seen in FIG. 4, retainer sleeve 16 is formed from a cylindrical tube that is provided with a plurality of flexible curved tabs 20 that extend outwardly and are spaced apart around the circumference of the tube substantially at the mid section of the tube. Tabs 20 are curved in the preferred embodiment as seen in FIG. 5 to provide for smoother operation. Tabs 22, which are optional, are located at the lower end of the tube and spaced around the circumference. Tabs 22 serve to center guide tube assembly 12 in the bore through upper end fitting 14 and provide a more rigid connection. Tabs 20 serve to retain guide tube 12 assembly and upper end fitting 14 in their installed position relative to each other. In the installed position, tabs 20 extend outwardly immediately above shoulder 24 defined at the lower end of each slot 18. This prevents upper end fitting 14 from being removed from guide tube assembly 12. As seen in FIGS. 1 and 2, upper end fitting 14 is provided with four vertically extending slots 18 that are spaced apart around bore 26 but do not extend the entire length of the bore. In order to provide the necessary resilient biasing action, retainer sleeve 16 is preferably made from a material that is used for springs and suitable for use in a nuclear application, such as nickel alloy 718.

Figure 3:
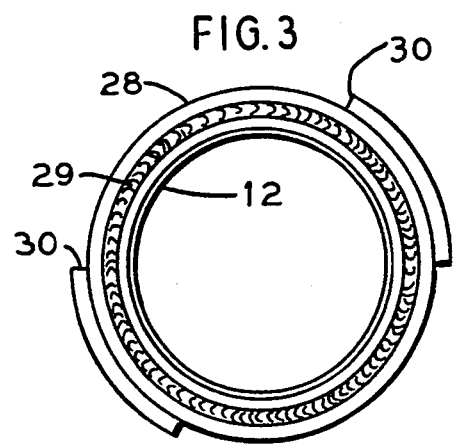
FIG. 3 is a top view of an upper end sleeve used according to the invention.

As seen in FIG. 1, guide tube assembly 12 is provided with an upper end sleeve 28 that serves as an attachment point for retainer sleeve 16. Upper end sleeve 28 may be attached to guide tube assembly 12 by any suitable means such as welding as indicated by the numeral 29. As best seen in FIGS. 1, 3 and 4, the retainer sleeve 16 of the invention is attached to upper end sleeve 28 by the use of lugs or rigid tabs 30 that extend around a portion of the circumference of upper end sleeve 28. Retainer sleeve 16 is provided with slots 32 that are sized to receive tabs 30. To provide a permanent connection, retainer sleeve 16 may also be attached to upper end sleeve 28 by any suitable method such as bonding or welding. Since guide tubes are usually relatively thin (approximately 19 mils), an upper end sleeve is normally included on guide tubes to provide a point for attachment to the upper end fitting and to provide the necessary support for a shoulder stop 34 seen in FIG. 1 to prevent the upper end fitting from moving down the guide tube assembly when the fuel assembly is in the vertical position.

During assembly, the upper end fitting 14 is pushed over upper end sleeve 28 and sleeve retainer 16. The tabs 20 and 22 are forced inboard as the end fitting slides over the guide tube assembly. When end fitting 14 is fully seated, a rotation tool not shown is received in tooling slots 34 on the upper end of retainer sleeve 16. The tool is used to rotate retainer sleeve 16 until tabs 20 spring outboard into slots 18 in upper end fitting 14. The presence of tabs 20 at shoulders 24 serve to retain upper end fitting 14 and guide tube assembly 12 in their relative installed positions. Tabs 22 maintain pressure against the walls of the bore 26 through end fitting 14 to retain guide tube assembly 12 in a centered position and provide for a more rigid connection. Removal of end fitting 14 is accomplished by engaging a rotating tool with tooling slots 34 and rotating retainer sleeve 16 approximately forty-five degrees to force tabs 20 inboard and then sliding end fitting 14 upward. As seen in FIG. 2, slots 18 are preferably semicircular to provide for ease of operation in forcing tabs 20 inboard during rotation of retainer sleeve 16.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a reconstitutable fuel assembly having an upper end fitting with a plurality of bores therethrough each sized to receive a guide tube assembly and at least one control rod guide tube assembly with the guide tube assembly including an upper end sleeve having a radially extending first shoulder at the lower end for engagement with the lower surface of said upper end fitting, an integral reusable locking arrangement between the guide tube assembly and upper end fitting comprising:
   a. said upper end sleeve having at least two rigid tabs that extend radially outward;
   b. said upper end fitting having a plurality of vertical slots that extend downwardly along a portion of the wall of each bore from the upper end thereof so as to define a second shoulder at the lower end of each of said slots;
   c. a cylindrical tube concentric with said upper end sleeve, said cylindrical tube having at least two slots sized to receive said tabs on said upper end sleeve and a plurality of flexible tabs extending outwardly and circumferentially spaced apart substantially at the mid section of said tube such that the tabs at the mid section of said tube are received in said vertical slots in the upper end fitting for engagement with said second shoulders, the lower end surface of said tube being engaged with said first shoulder.

2. The locking arrangement of claim 1, further comprising said cylindrical tube having at least two tooling slots at the upper end.

3. The locking arrangement of claim 1, further comprising said cylindrical tube having a plurality of flexible tabs that extend outwardly and are spaced apart around the circumference of the lower end of said cylindrical tube.

* * * * *